United States Patent
Zittel (10) Patent No.: US 6,182,833 B1
(45) Date of Patent: Feb. 6, 2001

(54) RECIPROCATING SPRAYER FOR A CYLINDRICAL WASTEWATER SCREEN

(76) Inventor: David R. Zittel, 155 Oak Grove Dr., Columbus, WI (US) 53925

(*) Notice: Under 35 U.S.C. 154(b), the term of this patent shall be extended for 0 days.

(21) Appl. No.: 09/500,860

(22) Filed: Feb. 9, 2000

(51) Int. Cl.$^7$ .......................... B01D 33/11; B01D 33/42; B01D 33/50

(52) U.S. Cl. .......................... 210/391; 210/393; 210/394; 210/403; 210/411; 210/107; 210/108; 239/752; 239/264

(58) Field of Search .................... 210/391, 393, 210/411, 108, 403, 394, 107; 239/752, 264

(56) References Cited

U.S. PATENT DOCUMENTS

| 5,433,849 | 7/1995 | Zittel . |
| 5,494,227 | * 2/1996 | Costantini . |

FOREIGN PATENT DOCUMENTS 7-246304 * 9/1995 (JP) .

* cited by examiner

Primary Examiner—Thomas M. Lithgow
(74) Attorney, Agent, or Firm—Nilles & Nilles SC (57) ABSTRACT

A reciprocating power sprayer for cleaning a rotating cylindrical wastewater screen of the type formed of tubular perforate wedgewire. The spray is reciprocated on an elongated pneumatic cylinder which is arranged in parallelism along the cylinder wastewater screen. Controls are provided for automatically controlling the reciprocation of the spray.

8 Claims, 10 Drawing Sheets

RECIPROCATING SPRAYER FOR A CYLINDRICAL WASTEWATER SCREEN

FIELD OF THE INVENTION

The present invention relates to cylindrical-type wastewater screens and more particularly to a sprayer for cleaning the cylindrical screen during operation.

BACKGROUND OF THE INVENTION

Wastewater is a byproduct of many industrial processes that use water. For example, the food industry relies rather heavily on water for processing food. Water is used to clean vegetables, beef, fish, poultry, and other types of food often before the food is cooked, blanched or sterilized using other water. Unfortunately, after all this water is used it typically must also be processed to clean it so it can be either reused or inexpensively disposed. As a result of rather restrictive environmental laws and regulations that have made disposal of unprocessed wastewater prohibitively expensive, wastewater processing or preprocessing at the site of the food processing facility is desirable.

One apparatus that has proved particularly effective at treating wastewater is a cylindrical-type wastewater screen and such is shown and described in my U.S. Pat. No. 5,433,849, issued Jul. 18, 1995. As shown in that patent, a cylindrical-type wastewater screen has a cylindrical screen, typically comprised of perforate wedgewire, into which the wastewater is introduced while the screen is rotated. The wastewater passes radially outwardly through the screen after which it can be reused, further filtered, or disposed. Solids entrained in the wastewater that were filtered out of the wastewater can be cheaply disposed of as landfill or fertilizer. As shown, two cylindrical-type screens having successively finer screen media can be concentrically arranged to provide staged treatment of wastewater.

During operation, wastewater introduced within the cylindrical screen passes radially outwardly through perforations in the screen while most of the solids entrained in the wastewater is filtered by and retained in the screen because the perforations typically are no greater than about ten to twenty thousandths of an inch. The filtered solids often cling to the screen and the screen is rotated to cause gravity to encourage the solids to separate from the screen and fall to the bottom of the screen. A small flow of wastewater at the bottom of the screen carries the solids from the screen helping to keep the screen clean.

Many times, sticky solids, such as fat, connective tissue, coatings, starch, and other sticky residue will continue to cling to the screen despite rotation of the screen. The sticky solids can also cause other solids in the wastewater to stick to it and in general will significantly reduce the efficiency of the screen by partially or completely plugging perforations. Should too many perforations become plugged, the screen will have to be taken offline and cleaned.

To help keep the screen clean to prevent too many perforations from becoming plugged, fixed or stationary nozzles carried by a manifold which is disposed adjacent the screen can discharge cold water, hot water, steam or even air forcefully against the screen. Several spaced apart nozzles must be used to clean the screen along its entire axial length. Unfortunately, where water is used, each nozzle typically requires a flow of as much as about 3 gallons per minute such that a typical screen can use as much as 30 to 90 gallons of water per minute, depending on the number of nozzles required and the type of screening apparatus used. For example, where a double cylinder wastewater screen is used, such as is disclosed in U.S. Pat. No. 5,433,849 to Zittel, as many as 30 nozzles fixed to at least two manifolds are used to keep both cylinders clean. While the frequency of cleaning can vary with the type of solids entrained in the wastewater, each cleaning cycle nonetheless uses a lot of water which undesirably increases wastewater treatment costs.

While reciprocating sprayers have been used in some types of similar processing equipment, they have not been viewed as particularly well suited for use in cylindrical-type because of reliability considerations and because of concern they could not effectively clean the rather small perforations found in wastewater screens. For example, it is known to use a reciprocating sprayer to direct water against a perforate cylinder of a bean snipper to free the perforations of bean parts that have become lodged in them. However, the perforations in the cylinder of a bean snipper are much larger, typically at least 13/64 (0.203) of an inch, the cylinder is made of polycarbonate, and a bean snipper is used to cut beans, not process wastewater. Moreover, it is not believed that the reciprocating sprayer used in bean snippers discharges water at a great enough pressure to completely pass through the exterior of the screen adjacent the sprayer and impact against the interior of the screen on the opposite side.

SUMMARY OF THE INVENTION

In accordance with the present invention, a reciprocating sprayer is provided that discharges liquid from a spray nozzle and through a cylindrical screen so as to dislodge solids on the interior surface of the screen adjacent the sprayer, and also from the interior surface of the screen on the diametrically opposite side of the cylinder. The invention also provides a reciprocating sprayer that discharges liquid from a traveling spray nozzle through a pair of concentrically arranged cylindrical-type screens of a double cylindrical-type screen in a manner that dislodges solids from both screens.

Other objects, features, and advantages of the present invention include a reciprocating sprayer which is rugged, simple, flexible, reliable, and durable, and which is of economical manufacture and is easy to assemble, install, and use.

BRIEF DESCRIPTION OF THE DRAWINGS

At least one preferred exemplary embodiment of the invention is illustrated in the accompanying drawings.

DETAILED DESCRIPTION OF THE INVENTION

Figure 1:
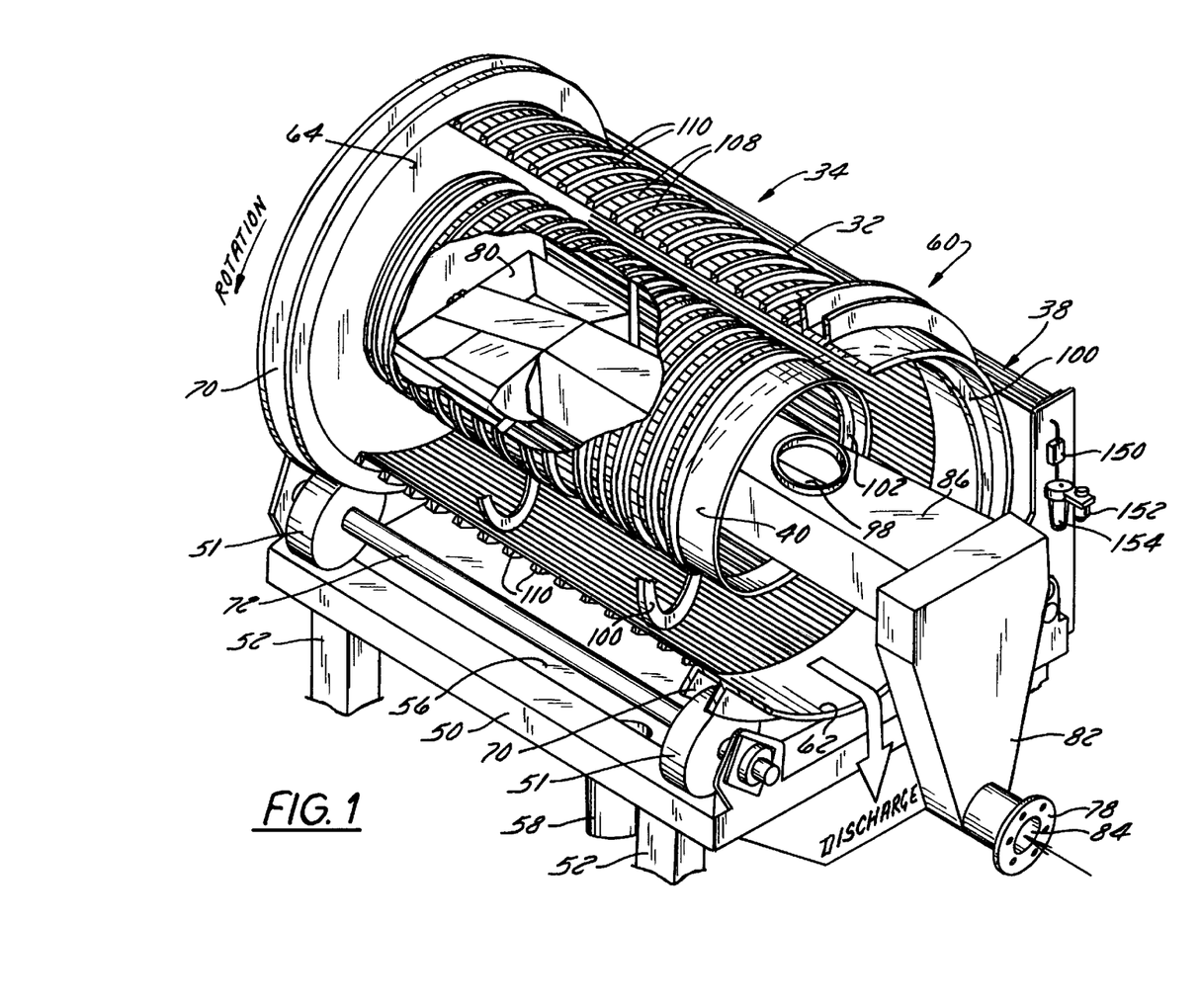
FIG. 1 is a perspective view of dual cylindrical-type wastewater screen, certain parts being shown as broken away or removed for the sake of clarity in the drawings.

FIG. 1 shows a double cylindrical waste water screen for cleaning waste water which is introduced to the lower right-hand side of the machine via inlet 84 and conducted into the center of the inner cylindrical screen via conduit 82. The general organization and function of the machine shown in FIG. 1 is described in some detail in my U.S. Pat. No. 5,433,849, issued Jul. 18, 1995, and reference may be had to that patent which forms a part of this specification. It is believed sufficient to say, however, that the following detailed description of the drum-type wastewater screen and apparatus is sufficient for purposes of describing the present invention as follows.

Figure 2:
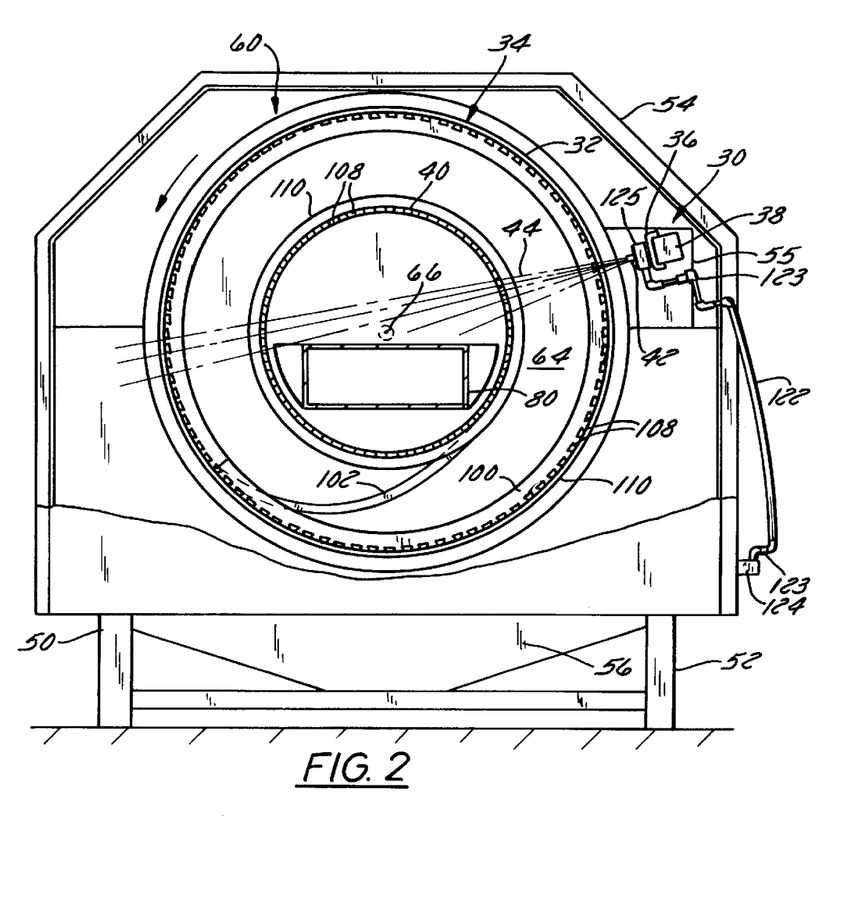
FIG. 2 is a transverse cross-sectional view, being more or less schematic in nature with certain parts removed, of the dual cylinder screen arrangement shown in FIG. 1.

A reciprocating sprayer 30 (FIGS. 2, 6, 7, 8, and 12) for cleaning cylindrical perforate screens 32 and 40 of a wastewater screening apparatus 34. The sprayer has a carriage 36 (FIGS. 2, 6, 7 and 8) that reciprocates along a rodless air cylinder 38 (FIGS. 1, 2, 3, 9, 10 12) which is located in parallelism for long stroke requirement* alongside the outer screen 32 and inner screen 40 of a double-cylindrical type screening apparatus. The carriage 36 has a nozzle 42 (FIGS. 2, 3, 4, 8, 9, 10, 11, 12, 13) that discharges a fluid 44 against the outer screen 32 (FIGS. 2, 3) as the carriage reciprocates back and forth alongside the screen. Solids 46 (FIG. 4) which stick to or are attached to interior surfaces of the screens are dislodged from the screens by the fluid as the fluid passes through the screen.

The screening apparatus 34 is mounted on a frame 50 (FIG. 1) that carries the concentrically arranged screens 32, 40 and has legs 52 that space the apparatus above the ground. Also carried by the frame 50 is a housing 54 (FIGS. 2, 3) that encompasses the screens and the sprayer 30. Four rollers 51 (FIGS. 1, 4) rotationally support the screens and are driven by a motor and conventional belt 55 and pulleys (not shown). Disposed below the screens is a trough 56 (FIGS. 1, 2, 4, 5) that serves as a collection pan for collecting the wastewater after it has passed through the screens. The trough 56 has a drain 58 (FIG. 4) through which the screened wastewater is discharged. Collectively, the housing 54 and trough 56 ensure that the wastewater, as well as cleaning fluid (where the fluid is a liquid), is retained within the screening apparatus.

Figure 3:
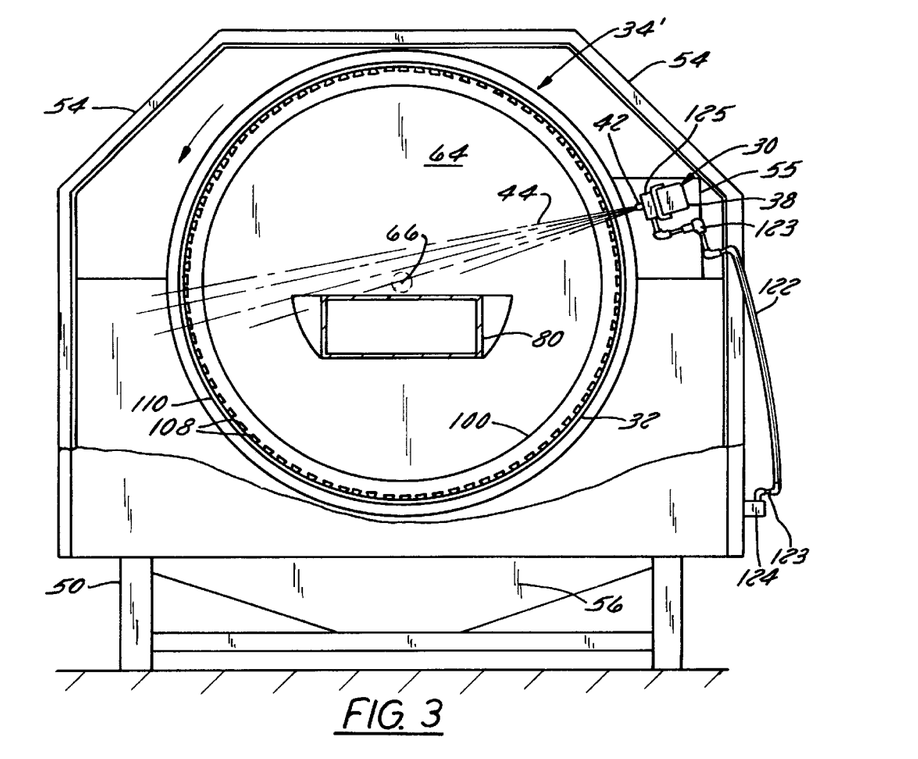
FIG. 3 is a view similar to FIG. 2 but showing a single cylinder arrangement.

The inner screen 40 and outer screen 32 are part of a double screen assembly 60 (FIGS. 1, 2, 4) that includes two cylindrical screens 32 and 40. FIGS. 3 shows a single cylindrical screen arrangement. There is an effluent discharge end 62 (FIGS. 1, 4) at one end that preferably is at least partially open so that solids 46 screened from the wastewater can be discharged from the apparatus. To catch solids 46 filtered from the wastewater, there is a second trough 63 (FIGS. 3, 4) disposed below the screen assembly 60 adjacent the effluent discharge end 62. To help urge solids 46 toward the effluent discharge end 62, each screen preferably has a generally spiral-shaped or helical auger 100, 102 (FIGS. 1, 2, 4) inside the screen that preferably can be fixed to the screen.

Figure 4:
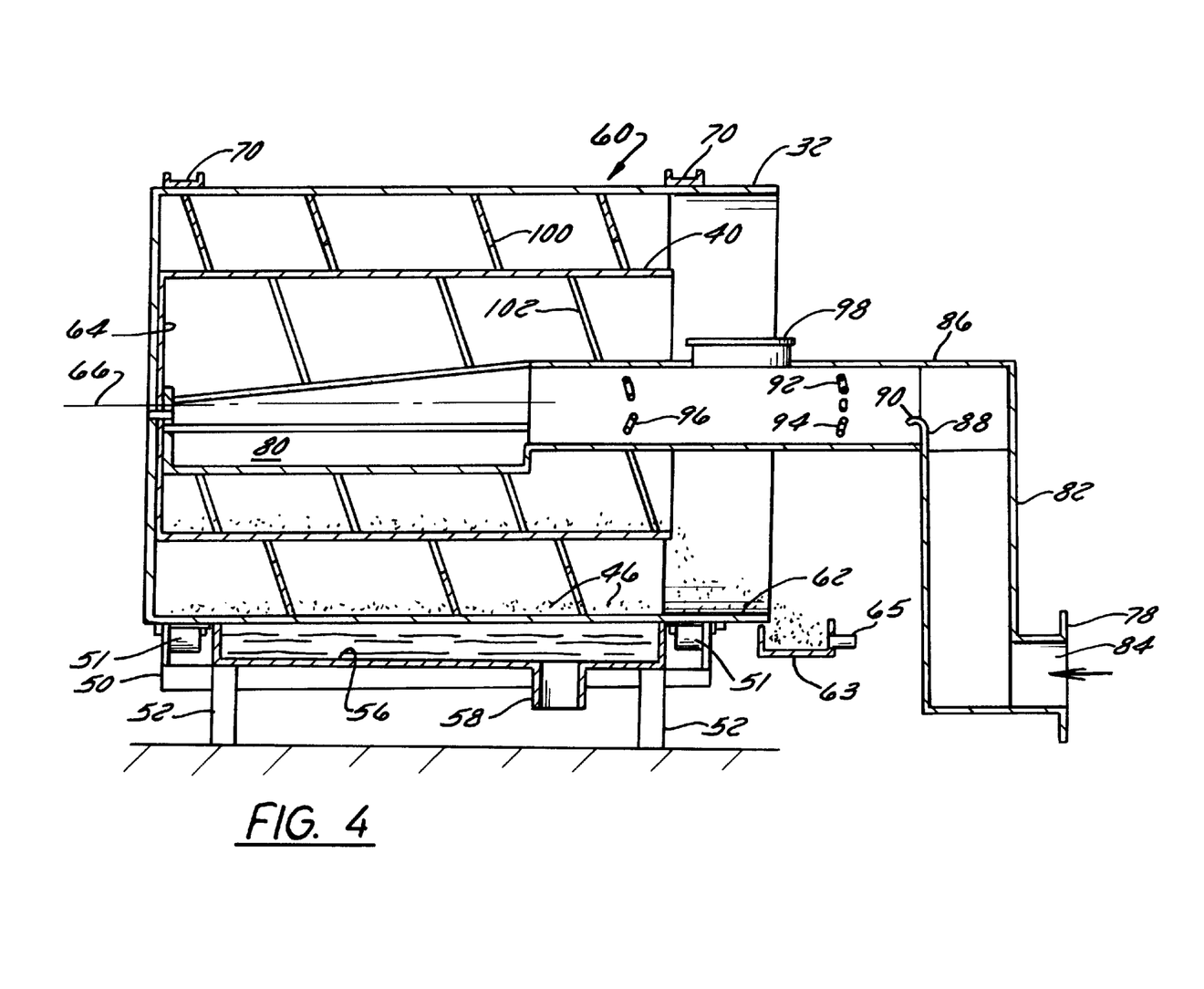
FIG. 4 is a longitudinal sectional view through the dual screen arrangement shown in FIG. 1 being more or less schematic in nature, with certain parts removed for the sake of clarity.

The screen assembly 60 preferably is closed at its end opposite the discharge end by a disc-shaped drum head 64 (FIG. 4) to which one or both cylindrical screens 32, 40 preferably are fixed. In a preferred embodiment, such as is shown in FIGS. 1 and 4, both screens are fixed to the head 64 for rotation in unison therewith about a longitudinal axis of rotation 66 that preferably is a common axis of rotation. The outer screen 32 of the screen assembly 60 is rotatively supported on the frame by rollers or trunnions 51 (FIGS. 1, 4) that are received in spaced apart channels 70 or the like carried by the outer screen 32. As is shown in FIG. 1, a preferred embodiment of the apparatus has two pairs of spaced apart rollers or trunnions 51 (FIGS. 1, 4) with each pair of trunnions carried by an axle 72 journaled for rotation to the frame.

Wastewater to be cleaned is delivered to the machine as follows. A wastewater infeed 78 (FIGS. 1, 4) has an outlet 80 disposed inside the inner screen 40 for introducing the wastewater to be screened to the inner screen 40. Where the screening apparatus 32 is of single screen construction, such as is depicted in FIG. 3, the infeed outlet 80 is disposed inside of screen 32 and directly introduces the wastewater therein.

In its preferred embodiment, the infeed 78 includes a vertical conduit or column 82 (FIGS. 1, 4) that communicates liquid to be screened from its inlet 84 to a generally horizontally extending conduit or trough 86 where the wastewater is discharged from the outlet 80 (FIGS. 1, 4) into the screen. The outlet 80 preferably is located adjacent the closed end (to the left in FIGS. 1 and 4) of the screen assembly and each screen can be inclined such that the closed end is disposed at least slightly above the effluent discharge end to help spread the flow of wastewater more evenly over the entire axial length of each screen and to help encourage flow of solids 46 out the discharge end. As is shown in FIG. 4, to help smooth flow of wastewater inside the infeed 78, the infeed has an internal weir 88 with a lip 90 and a number of spaced apart internal baffles 92, 94 and 96. To facilitate cleaning of the infeed, the horizontal conduit 86 can be equipped with a clean-out port 98.

Figure 5:
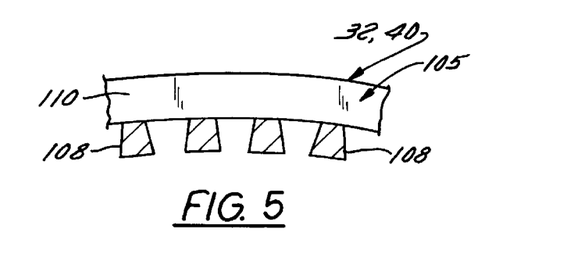
FIG. 5 is a fragmentary, enlarged view of the outer and also of the inner concentric wedgewire cylinders.

FIG. 5 depicts a fragmentary enlarged cross section of the outermost screen 32 and also the screen 40. Preferably, each screen is comprised of wedgewire screens 105 which are less subject to becoming plugged or jammed than other types of screens. Each wedgewire screen is comprised of a plurality of wires 108 that are arranged to form a cylinder and which are held captive by spaced apart bands 110 that extend about the circumference of the screen. In a preferred embodiment, each wire 108 and band 110 is constructed of a metal that preferably is a stainless steel Wire 108 has a preferred wire configuration of generally triangular or truncated triangular cross section. Where each axially extending wire 108 is of generally triangular or truncated triangular cross section, the base of each triangle formed is disposed (as shown in FIG. 5) toward the interior of the screen. In a typical screen arrangement, there are several circumferentially arranged bands 110 that are affixed to the wires to help form them into a screen that is a drum or cylinder. The wires 108 extend axially and the bands 10 circumferentially around the exterior of the wires.

The spacing between each pair of adjacent wires 108 is selected to permit liquid to flow therebetween while blocking solids 46 having a size about the same or bigger than the spacing. In a preferred embodiment, where the screen apparatus is a double-cylinder screen, the spacing between adjacent wires of the inner screen 40 is greater than the spacing between adjacent wires of the outer screen 32. In a preferred double-cylinder embodiment, the wire-to-wire spacing of the inner drum 40 range from between about 0.040 inches and about 0.060 inches and the wire-to-wire spacing of the outer drum 32 range from between about 0.010 inches and about 0.020 inches depending upon the type and size of solids likely to be encountered.

Where the apparatus 34' (FIG. 4) is of single screen construction, the wire-to-wire spacing of the screen 32 ranges between about 0.030 inches and about 0.060 inches.

The outer screen has an inner diameter of at least about 24 inches and typically no greater than about 60 inches and is at least about 48 inches long and no greater than about 168 inches long. Where the screen apparatus is a double drum screen, the inner screen has an inner diameter of at least about 12 inches and typically no greater than about 48 inches and is at least about 24 inches long and no greater than about 60 inches long.

As a result of the aforementioned parameters and depending on the application, a preferred single drum screen can screen or filter at least about 4500 gallons per minute of wastewater. A preferred double drum screen can screen or filter at least about 3000 gallons. As a result of using the reciprocating sprayer 30 of this invention discussed in more detail below, the flow of wastewater that can be screened or filtered is increased over a screen having a conventional non-reciprocating spray arrangement. Moreover, because cleaning is more efficient, a screen equipped with a sprayer 30 of this invention is cleaned more thoroughly, decreasing downtime of the screen.

Reciprocating Sprayer

Figure 6:
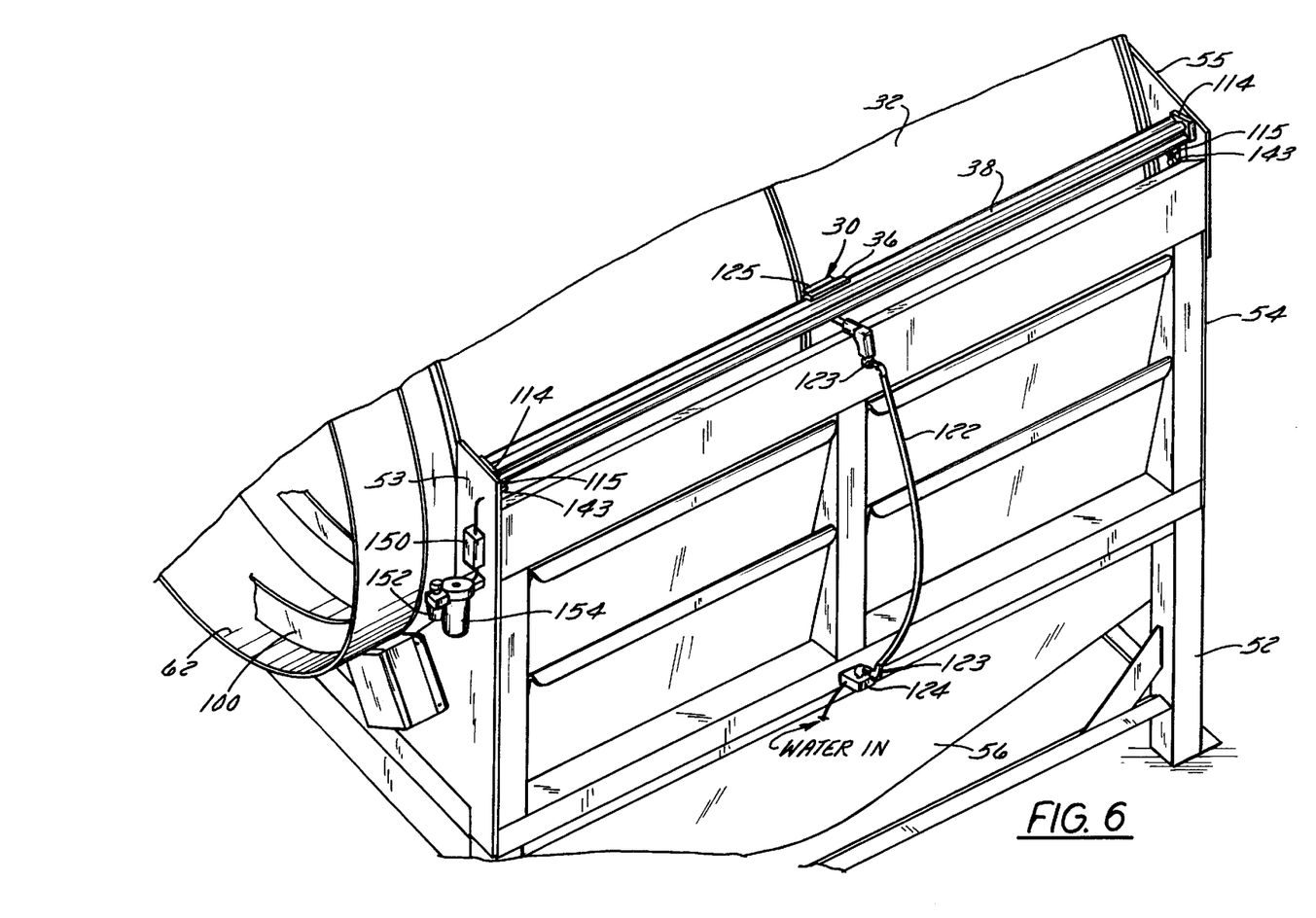
FIG. 6 is a schematic perspective, fragmentary view showing the waste water machine and showing the traveling spray mounted thereon.
Figures 7, 8:
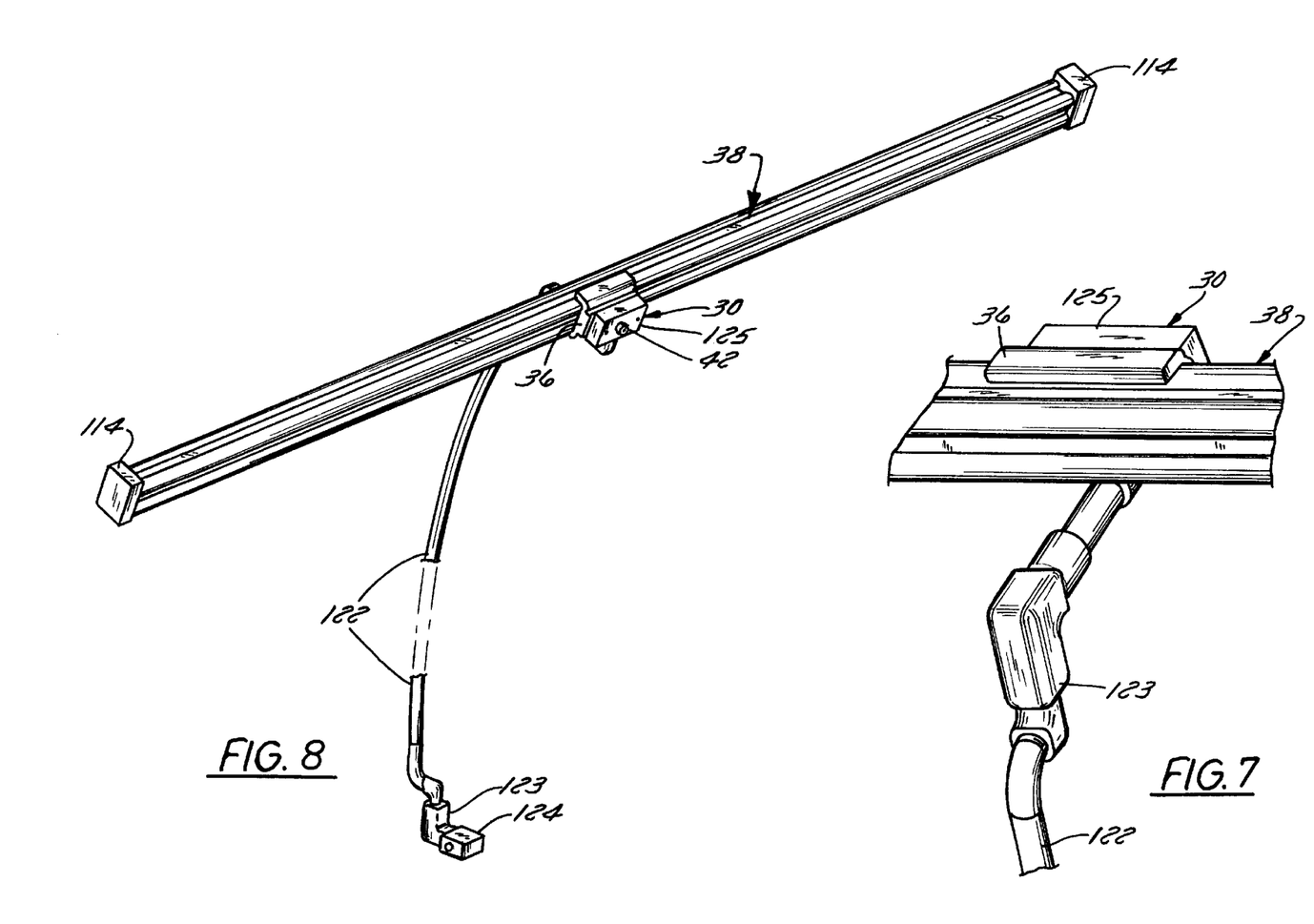
FIG. 7 is a perspective, fragmentary view of the traveling spray shown in the center portion of FIG. 6, but on an enlarged scale.
FIG. 8 is a perspective view of the spray mechanism shown in FIG. 6, but from the opposite side thereof.
Figure 9:
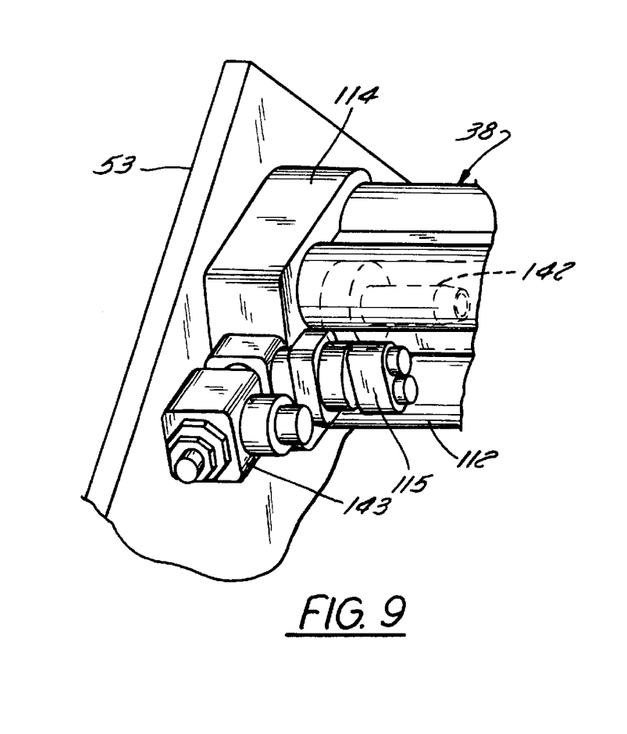
FIG. 9 is an enlarged, fragmentary view of the sensor, air flow valve, and bracket at the left-end of the control apparatus as shown in FIG. 6.
Figure 10:
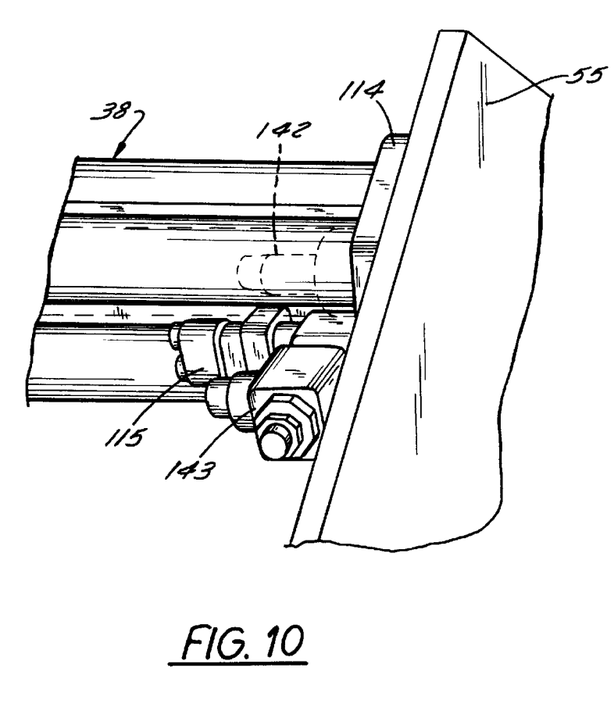
FIG. 10 is a fragmentary perspective view of the sensor, air flow valve, and bracket as shown at right-end portion of FIG. 6 but shown on an enlarged scale.
Figure 11:
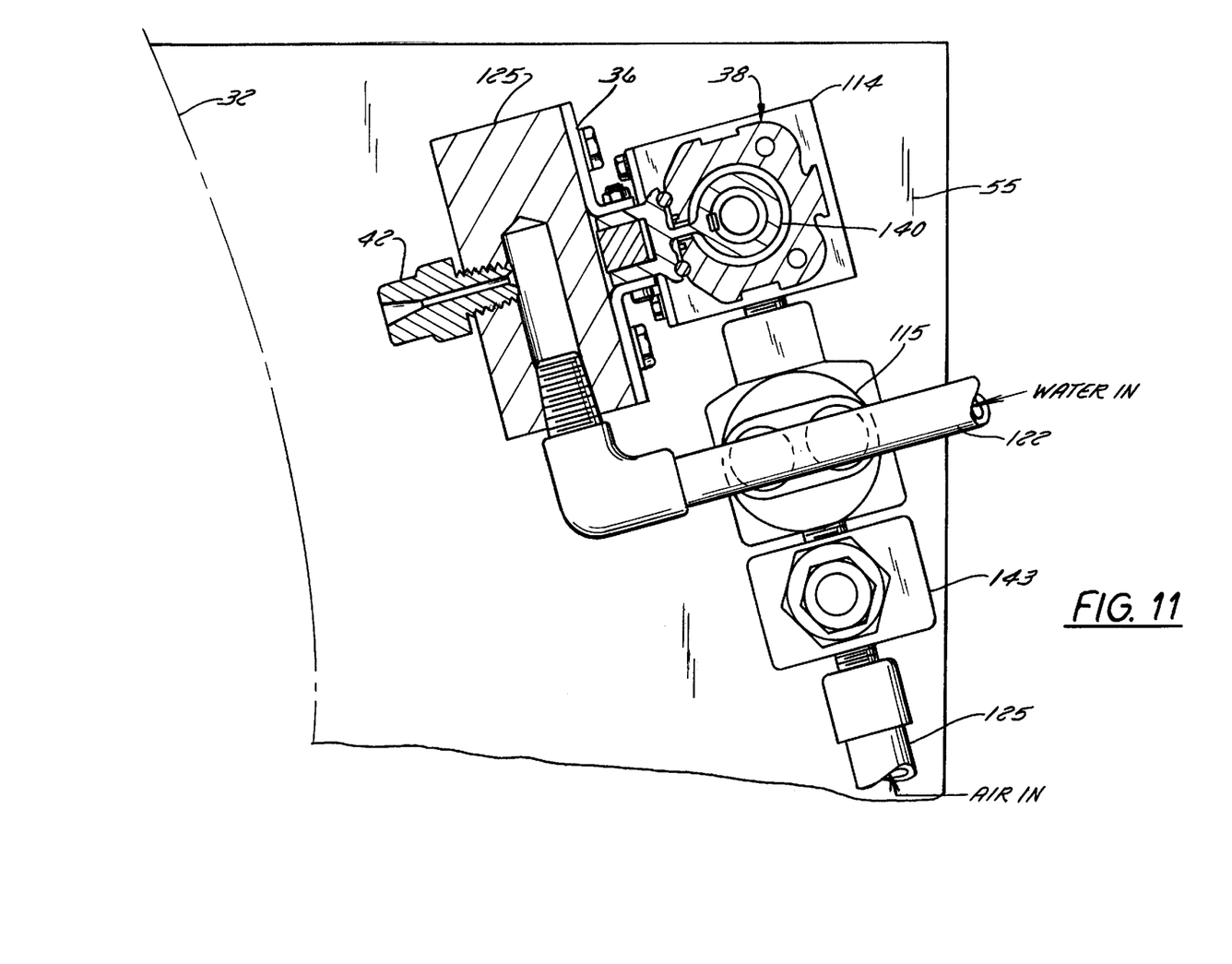
FIG. 11 is an enlarged cross-sectional view taken transversely in FIG. 12 of the spray nozzle and its carriage for reciprocating along its cylinder rail.

FIGS. 6–13 illustrate a preferred embodiment of a sprayer 30 of this invention that discharges a cleaning fluid toward and through the screen or screens. The previously mentioned nozzle 42 of the sprayer 30 discharges cleaning fluid toward a screen and can be disposed so as to discharge cleaning fluid through the sidewalls of two screens. The nozzle 42 is part of carriage 36 that reciprocates along rodless cylinder 38, permitting the nozzle 42 to move relative to the screen or screens being cleaned. As is shown in FIG. 6, a flexible conduit 122, extends from a water manifold 124 (FIG. 6) via swivel joints 123 to the carriage 36, with the fluid ultimately being communicated to the nozzle 42. The carriage 36 preferably comprises a manifold 125.

Manifold 125 and nozzle 42 ultimately receives fluid from a conventional pressurized fluid source (not shown).

In the preferred embodiment shown in FIGS. 6–13, the rodless cylinder 38 extends substantially along the length of the cylindrical screen. The rodless cylinder 38 has end caps 114 that having mounting and porting means formed integrally therein.

The end caps 114 are constructed and arranged to dispose the rodless cylinder 38 and nozzle 42 about three inches from the screen surface of the screen 32 toward which it is directed. The outermost screen surface comprises the exterior surfaces of the wedgewires 108 that makeup the outermost screen.

Spray Nozzle Carriage

Figure 12:
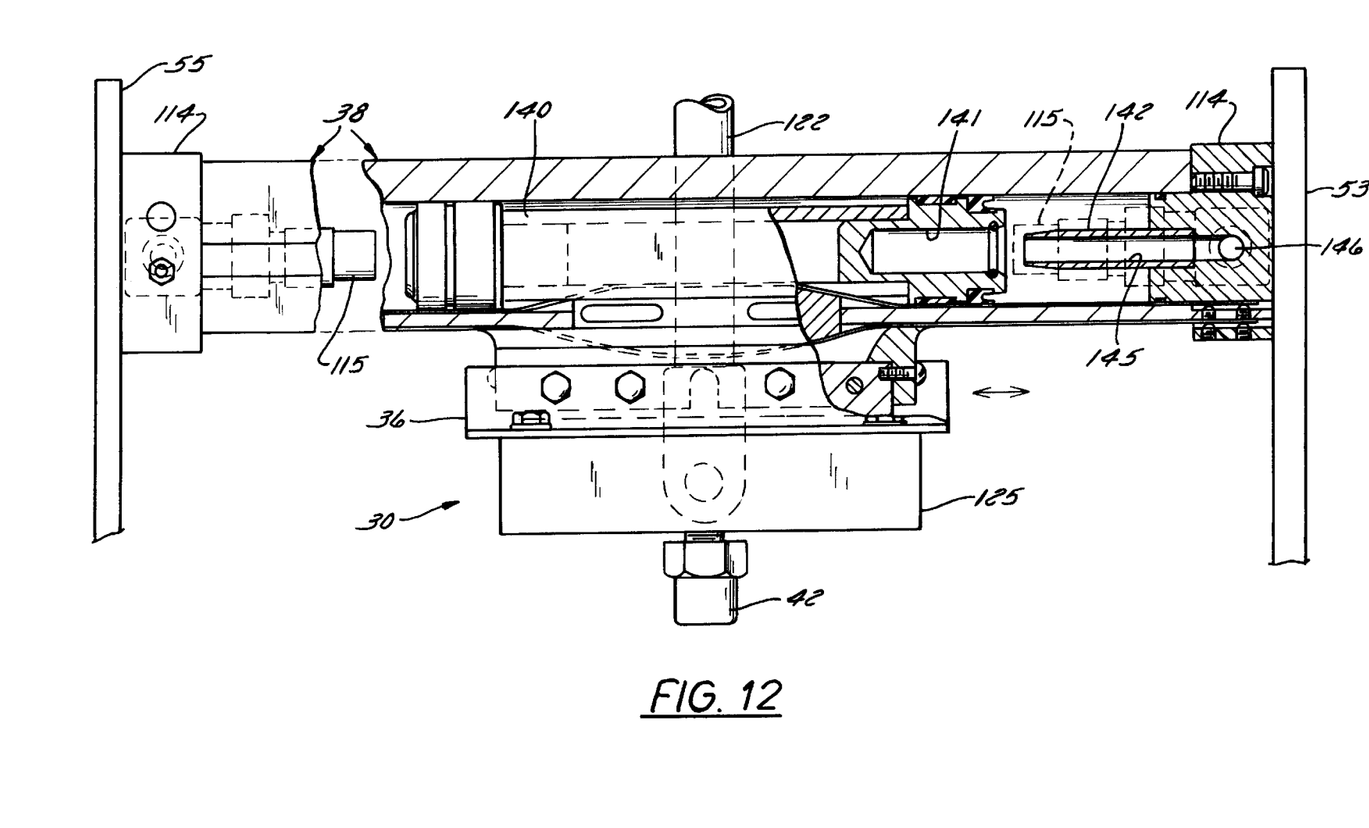
FIG. 12 is an enlarged, longitudinal view partially in section, through the spray carriage.
Figure 13:
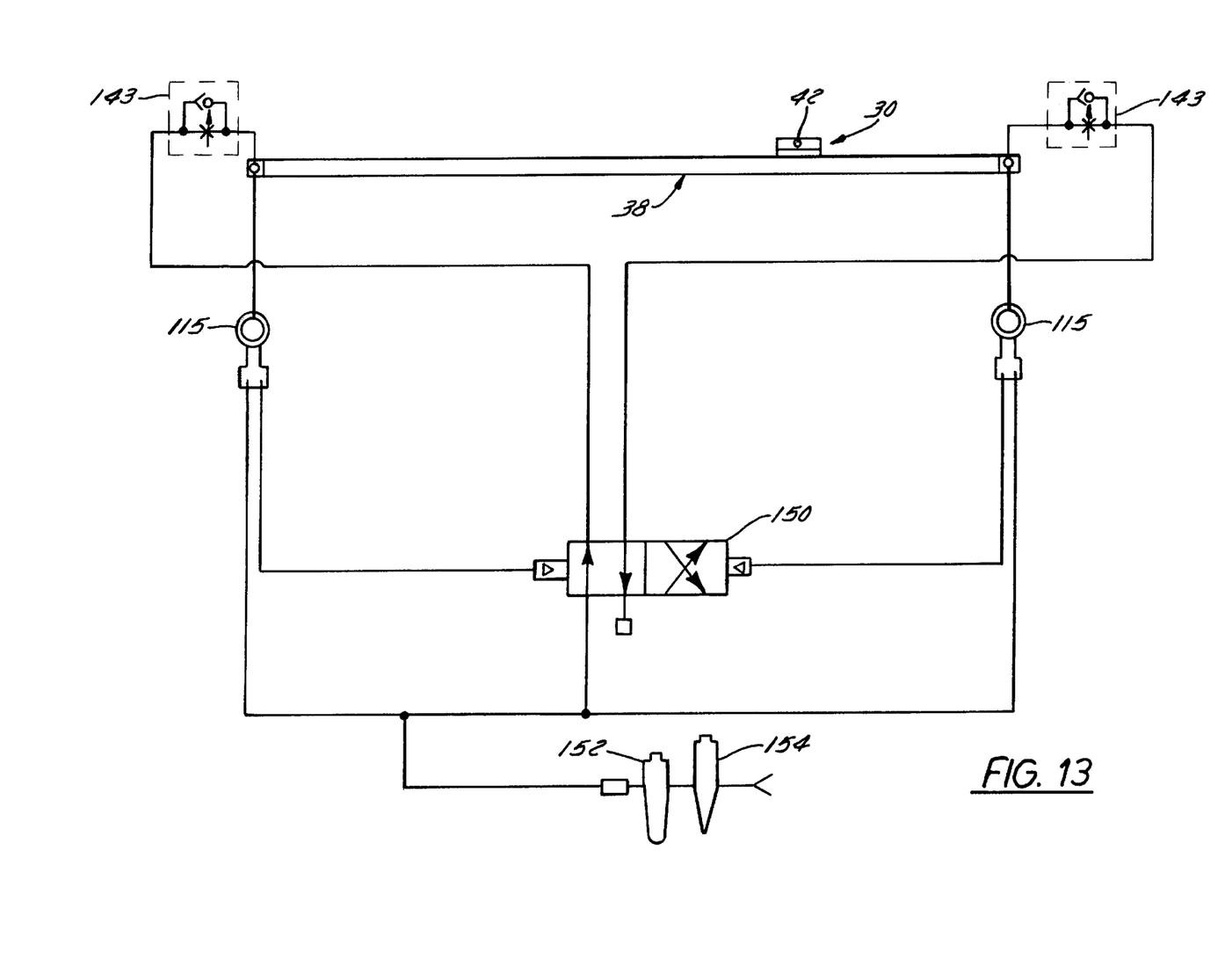
FIG. 13 is a schematic view of the traveling spray including its control circuit.

A fluid such as air is used to move the carriage 36 and nozzle 42 along the cylinder 38 in one direction or the other. Referring to FIGS. 9, 10, 11, 12, and 13, each end cap 114 carries a threshold sensor 115 that detects when the carriage 36 which is attached to and moved by piston 140 (FIGS. 11 and 12) has reached a desired limit of travel and enables its direction of travel to be reversed. The threshold sensor provides pneumatic feedback information on the position of the carriage on pneumatic cylinder 38. For example, as shown in FIG. 12, each end of the piston 140 has a cylinrical bore 141 which slides over the projection 142 having a central passage 145 that communicates via passage 146 with the sensor 115. This connection 141–142 acts to throttle the air and cushions the end of the stroke of the piston 140. Thus, these devices monitor the back pressure of the cylinder's exhausting chamber. When the cylinder stops, the back pressure drops and the threshold sensor provides the desired output. The sensors 115 are each operatively connected to an air flow control valve 143 (FIGS. 6, 9, 10, 11 and 13) that causes the direction of air flow propelling the carriage 36 to be reversed. Thus, the carriage 36 is moved by air in one direction until it reaches the end of the cylinder. This causes the four-way main air valve 150 (FIG. 13) to move to a second position that changes the air flow to the cylinder 38 causing the carriage to move in the opposite direction. A conventional air lubricator 152 and an air regulator 154 (FIGS. 6 and 13) are provided in the circuit.

Operation

During operation, liquid at a pressure of at least about 350 pounds per square inch (psi) and no greater than about 1000 psi is expelled from the nozzle toward the outermost screen. Where the wedgewire screen is a single cylindrical screen, liquid at a pressure of at least about 350 psi is expelled from the nozzle at a flow rate of at least about 10 gallons per minute so that expelled liquid will pass completely through the rather small holes in one side of the screen disposed adjacent the nozzle and impact against an interior surface of the screen on an opposite side. As a result, solids clinging to the interior surface of the side of the wedgewire screen adjacent the nozzle are loosened and preferably dislodged from the screen. And solids clinging to the interior surface of the side of the screen opposite the nozzle are also loosened and dislodged from the screen. By this advantageous arrangement, cleaning of the screen is optimized, done more quickly, and with less water than in the past.

Where the screen is of double-cylinder construction, liquid at a pressure of at least about 1000 psi is expelled from the nozzle 42 at a flow rate of at least about 6 gallons per minute so that expelled liquid will pass completely through the rather small holes or perforations in one side of the outer screen disposed adjacent the nozzle 42, will pass through the rather small holes in one side of the inner screen disposed adjacent the nozzle 42, will impact against an interior surface of the inner screen on a side opposite the nozzle, will pass through the small holes in the inner screen on the side opposite the nozzle 42, and will impact against an interior surface of the outer screen on an opposite side.

Although the nozzle is shown disposed in a general horizontal position relative to the force of gravity, the nozzle preferably is disposed between about an eight o'clock position and about an eleven o'clock position. Where a double-cylinder screen is used, the nozzle preferably is disposed between a nine o'clock and about an eleven o'clock position. Preferably, the nozzle is disposed at about a ten o'clock position to eject liquid at the same angle toward the outermost screen.

Where the cleaning fluid discharged from the nozzle 42 is a gas, the nozzle is located closer to the screen toward which it is pointed. Where the nozzle 42 is exteriorly disposed, the nozzle 42 is disposed no farther than about 2 inches from the outer surface of the screen toward which it is directed.

Where the cleaning fluid is a gas, preferably air, the gas provided to the nozzle 42 has a pressure of at least 80 psi. In one preferred method of operation, gas is discharged from each nozzle 42 of the system at a flow rate of at least about 25 cubic feet per minute (cfm). For particularly demanding cleaning applications, the gas has a pressure of at least 150 psi and a flow rate of at least 30 cfm.

Where gas is the cleaning fluid, the gas is provided to the nozzle 42 from a high pressure gas source. One preferred source is an air compressor, such as a rotary piston air compressor. Another preferred source is standard shop air having a pressure of between 100 psi and 150 psi. A still further preferred gas source is a squirrel cage blower where the application involves higher volumes of air, but with lower impact force. This is particularly useful for very light product.

It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. apparatus for screening wastewater comprising:

a frame;

a rotatable cylindrical screen carried by the frame and having an axis of rotation and which is defined a tubular perforate wedgewire sidewall having an interior wedgewire surface and an exterior wedgewire surface;

a wastewater conduit having an opening disposed inside the wedgewire sidewall through which conduit effluent is discharged;

an elongated pneumatic rodless cylinder positioned along the length of said cylindrical screen, a carriage slidably mounted along said pneumatic rodless cylinder, said carriage having a power nozzle sprayer that reciprocates with said carriage and from which fluid is ejected against the wedgewire sidewall to dislodge solids from the wedgewire sidewall, said power nozzle sprayer being coupled to a first end of a flexible conduit that communicates said fluid to the power nozzle sprayer;

a first end cap connected to a first end of the pneumatic rodless cylinder, the first end cap including a first threshold sensor, the first threshold sensor detecting when the carriage has reached desired limit of travel and providing pneumatic feedback information regarding the position of the carriage;

a second end cap connected to a second end of the pneumatic rodless cylinder, the second end cap including a second threshold sensor, the second threshold sensor detecting when the carriage has reached a desired limit of travel and providing pneumatic feedback information regarding the position of the carriage;

a four-way main air valve that provides air flow to the rodless cylinder which controls a direction travel of the carriage along the rodless cylinder, the four-way main air valve changing position in response to the pneumatic feedback information and the carriage changing a direction of travel in response to the change in position of the four-way main air valve; and a pump in fluid flow communication with a supply of said fluid for delivering the fluid to the power nozzle sprayer.

2. The apparatus of claim 1 wherein the sprayer ejects fluid under pressure sufficient to impinge against pass through the outer surface of the wedgewire sidewall and then impinge against an inner surface of the wedgewire sidewall such that solids are dislodged at both regions of impingement.

3. The apparatus of claim 2 wherein the sprayer ejects fluid at a pressure of at least about 80 to 1000 psi.

4. The apparatus of claim 3 wherein the sprayer ejects fluid at a volume of about 6 to 10 gallons per minute.

5. The apparatus of claim 4 wherein the sprayer reciprocates back and forth at a rate of 1 to 10 cycles per minute.

6. The apparatus set forth in claim 1 wherein the wedgewire sidewall of said cylinder has openings of 10 to 20 thousands of an inch.

7. The apparatus of claim 2 further comprising a second cylindrical screen that is comprised of a tubular perforate wedgewire sidewall wherein the fluid from the sprayer is under sufficient pressure that it impinges against and passes through the outer surface of the outer cylinder, the outer surface of the inner cylinder, the inner surface of the inner cylinder, and the inner surface of the outer cylinder.

8. The apparatus of claim 4 wherein the sprayer is disposed about 4 to 6 inches away from the outer sidewall of outer cylinder.

* * * * *